US012635661B1

(12) United States Patent
Madero et al.

(10) Patent No.: US 12,635,661 B1
(45) Date of Patent: May 26, 2026

(54) MAGNETIC LEVITATION ROTARY MILKING PARLOURS AND METHODS

(71) Applicant: MADERO EQUIPOS DE ORDEÑO, S.A. DE C.V., Torreón Coahuila (MX)

(72) Inventors: Pedro Patricio Madero, Torreón Coahuila (MX); Francisco Rivas, Torreón Coahuila (MX); Gabriel Machain, Torreón Coahuila (MX); Pedro G. Madero, Torreón Coahuila (MX)

(73) Assignee: MADERO EQUIPOS DE ORDENO, S. A. DE C.V., Torreón (MX)

( * ) Notice: Subject to any disclaimer, the term of this patent is extended or adjusted under 35 U.S.C. 154(b) by 0 days.

(21) Appl. No.: 19/287,238

(22) Filed: Jul. 31, 2025

(51) Int. Cl.
  A01J 5/003 (2006.01)
  B65G 54/02 (2006.01)

(52) U.S. Cl.
  CPC .............. A01J 5/003 (2013.01); B65G 54/02 (2013.01)

(58) Field of Classification Search
  CPC ... A01J 5/003; A01J 5/00; A01J 5/007; A01K 1/123; A01K 1/126; A01K 1/12; B65G 54/02
  See application file for complete search history.

(56) References Cited

U.S. PATENT DOCUMENTS

| | | | |
|---|---|---|---|
| 3,709,196 A | 1/1973 | Hicks | |
| 3,738,321 A | 6/1973 | Hicks | |
| 4,222,346 A | 9/1980 | Reisgies | |
| 4,396,373 A | 8/1983 | Dellinger | |
| 4,671,767 A | 6/1987 | Blechman et al. | |
| 5,013,243 A | 5/1991 | Tanaka et al. | |
| 5,678,998 A | 10/1997 | Honkuru et al. | |
| 6,299,450 B1 | 10/2001 | Honkuru et al. | |
| 6,450,118 B1 | 9/2002 | Eppers, Jr. | |

(Continued)

FOREIGN PATENT DOCUMENTS

| | | | |
|---|---|---|---|
| DE | 102021115841 A1 * | 12/2022 | ............. A01K 1/126 |
| EP | 0576085 A2 | 12/1993 | |

(Continued)

OTHER PUBLICATIONS

Madero Dairy Systems, Inc., "Premium Rotary System" brochure, pp. 1-6, published by Madero Dairy Systems, at least as early as Mar. 11, 2020, Houston, Texas (USA).

*Primary Examiner* — Trinh T Nguyen
(74) *Attorney, Agent, or Firm* — Jeffrey L. Wendt; The Wendt Firm , P.C.

(57) ABSTRACT

Rotary milking parlours and methods employing magnetic levitation (or suspension) drive systems and components. A magnetic sub-system includes a first magnetic element and a second magnetic element each comprising magnetic or ferromagnetic material. The first element is secured to an under side of a rotatable annular platform around or near it's perimeter, while the second element is secured to an upper side of a fixed annular support platform around it's perimeter. The first and second magnetic elements are separated by an air gap. The first and second magnetic elements each have a shape and magnetic flux flowing outside thereof such that the first and second magnetic elements repel each other with force sufficient to levitate the rotatable annular platform when some or all stalls have animals present therein.

6 Claims, 11 Drawing Sheets

(56)                References Cited

U.S. PATENT DOCUMENTS

| | | | |
|---|---|---|---|
| 6,659,771 B2 | 12/2003 | Honkuru et al. |
| 6,843,203 B2 | 1/2005 | Johannesson et al. |
| 7,131,394 B2 | 11/2006 | Johannesson et al. |
| 7,159,538 B2 | 1/2007 | Innings |
| 7,234,414 B2 | 6/2007 | Claycomb |
| 7,617,796 B2 | 11/2009 | Happel |
| 7,712,468 B2 | 5/2010 | Hargadon |
| 7,957,920 B2 | 6/2011 | Innings |
| 8,408,159 B2 | 4/2013 | Uziel |
| 8,490,576 B2 | 7/2013 | Ahrens |
| 8,695,532 B2 | 4/2014 | Sandberg |
| 8,794,183 B2 | 8/2014 | Ahlem |
| 8,800,487 B2 | 8/2014 | Hofman |
| 8,967,083 B2 | 3/2015 | Hoey |
| 9,149,018 B2 | 10/2015 | Hofman |
| 9,247,709 B2 | 2/2016 | Hofman |
| 9,462,782 B2 | 10/2016 | Hofman |
| 9,648,839 B2 | 5/2017 | Hofman |
| 9,918,450 B2 | 3/2018 | Krone et al. |
| 9,980,458 B2 | 5/2018 | Hofman |
| 10,159,213 B2 | 12/2018 | Brown |
| 10,327,414 B2 | 6/2019 | Hofman |
| 10,349,619 B2 | 7/2019 | Van der Sluis et al. |
| 10,506,792 B2 * | 12/2019 | Kronekvist ............ A01K 1/126 |
| 10,856,516 B2 | 12/2020 | Bardosy et al. |
| 11,167,647 B2 | 11/2021 | Girotto |
| 11,428,263 B2 | 8/2022 | Girotto et al. |
| 11,927,041 B2 | 3/2024 | Girotto et al. |
| 2024/0124267 A1 | 4/2024 | Girotto et al. |

FOREIGN PATENT DOCUMENTS

| | | | |
|---|---|---|---|
| RU | 2843358 C1 * | 7/2025 |
| WO | WO 94/23565 | 10/1994 |
| WO | WO 2019/087152 A1 | 5/2019 |
| WO | WO 2020/138583 A1 | 7/2020 |

* cited by examiner

200

6
6
6
6
6
10
10

2) First Configuration:
● 24 Blocks,
● Divided in 4 Rails of Blocks of
● Type: D30 - L-136 mm

100

6
6
6
6
24
10

1) First Configuration:
● 4 Blocks,
● Divided in 2 Rails of Blocks of
● Type: D30 - L-486 mm

MAGNETIC LEVITATION ROTARY MILKING PARLOURS AND METHODS

BACKGROUND INFORMATION

Technical Field

The present disclosure relates to rotary parlours (systems) and methods of using same. In particular, the present disclosure relates to magnetic levitating (and magnetic suspended) rotary milking parlours and methods of making and using same.

Background Art

Rotary milking parlours and methods of using same are used in the animal miking industry.

Despite the apparent convenience of known rotary milking parlours, problems remain. Recurring issues include maintenance, operating costs, and lack of flexibility in speed. Many parlours operate at a fixed speed, mostly in an effort to reduce maintenance on complicated variable speed units. However, operating at fixed speed can limit flexibility in adapting to individual animal needs or addressing specific milking challenges. The labor and expense required to repair both fixed speed and variable speed units and other structures make repairs difficult for owners and repair professionals alike.

It would be advantageous to provide rotary milking parlours that reduce or avoid costly repairs associated with conventional platforms and drive units. The rotary milking parlours and methods of the present disclosure are directed to these needs.

SUMMARY

In accordance with the present disclosure, rotary milking parlours and processes are described which reduce or overcome many of the faults of previously known systems and processes. This invention proposes an enhancement to standard rotary milking parlours by employing magnetic levitation (or suspension) drive systems and components. The drive systems are designed to reduce maintenance, and/or provide more flexibility in speed, thereby addressing common problems of known rotary milking parlours.

A first aspect of the disclosure are magnetically levitated or magnetically suspended rotary milking parlours comprising:

a rotatable annular platform (sometimes referred to herein as a rotary platform) sufficient to support multiple animals, the rotatable annular platform rotatable about an axis of rotation and having a plurality of stalls in which the animals are to be milked, the stalls arranged about a first perimeter of the rotatable platform;

a fixed annular support platform having a second perimeter the same as the first perimeter, the rotatable annular platform magnetically levitated above the fixed annular support platform by a magnetic sub-system;

the magnetic sub-system comprising a first magnetic element and a second magnetic element each comprising magnetic or ferromagnetic material (such as iron, cobalt, nickel, steel, rare-earth magnetic metals, alnico metals, and combinations thereof), the first element secured to an under side of the rotatable annular platform around the first perimeter, the second element secured an upper side of the fixed annular support platform around the second perimeter, the first and second magnetic elements separated by an air gap, and each having axial symmetry with respect to the axis; and the first and second magnetic elements each have a shape and magnetic flux flowing outside thereof such that the first and second magnetic elements repel each other with force sufficient to levitate the rotatable annular platform when some or all stalls have animals present therein.

In certain embodiments the first magnetic element is one or more annular, U-shaped cross-section magnets, and the second magnetic element is a magnetic rail positioned inside the one or more annular, U-shaped cross-section magnet. In certain embodiments the one or more annular, U-shaped cross-section magnets may comprise two curvilinear rows thereof, and the magnetic rail may comprise two curvilinear rails, each curvilinear rail positioned in a respective curvilinear row. In certain embodiments the one or more annular, U-shaped cross-section magnets may comprise four curvilinear rows thereof, and the magnetic rail may comprise four curvilinear rails, each curvilinear rail positioned in a respective curvilinear row. In certain embodiments each stall comprises a bail with teatcups configured to be applied to the teats of an animal present in the stall, and at least one local milk tank connected to the teatcups via a respective milk conduit.

A second aspect of the disclosure are methods comprising (or consisting essentially of, or consisting of):

routing one or more animals into respective stalls on an annular platform sufficient to support the animals, the stalls arranged about a first perimeter of the rotatable platform;

rotating the annular platform about an axis of rotation while milking the animals;

the rotating of the annular platform being above a fixed annular support platform having a second perimeter the same as the first perimeter, the rotatable annular platform magnetically levitated above the fixed annular support platform by a magnetic sub-system;

the magnetic sub-system comprising a first magnetic element and a second magnetic element each comprising magnetic or ferromagnetic material, the first element secured to an under side of the rotatable annular platform around the first perimeter, the second element secured an upper side of the fixed annular support platform around the second perimeter, the first and second magnetic elements separated by an air gap, and each having axial symmetry with respect to the axis; and the first and second magnetic elements each have a shape and magnetic flux flowing outside thereof such that the first and second magnetic elements repel each other with force sufficient to levitate the rotatable annular platform when some or all stalls have animals present therein.

The rotary platform supports from about 500 to about 1500 kg per stall, plus a fully grown milking cow per stall. A rotary platform of 60 or more stalls needs magnetic energy sufficient to support an overall weight (if the animals are cows, frames, brackets, bails and associated equipment (teat cups, hoses)) of about 60 tons or more. If the weight of platform, animals, and equipment thereon exceeds the capacity of the magnet elements to levitate some or all of the platform, support rollers may be provided in some embodiments configured to support the platform, animals, and equipment thereon.

These and other features of the present disclosure will become more apparent upon review of the brief description of the drawings, the detailed description, and the claims that follow. It should be understood that wherever the term "comprising" is used herein, other embodiments where the term "comprising" is substituted with "consisting essentially of" are explicitly disclosed herein, and vice versa. It should be further understood that wherever the term "comprising" is used herein, other embodiments where the term "comprising" is substituted with "consisting of" are explicitly disclosed herein, and vice versa. Moreover, the use of negative limitations is specifically contemplated; for example, certain systems may include rare earth magnets, while other systems may be devoid of these.

BRIEF DESCRIPTION OF THE DRAWINGS

The manner in which the objectives of this disclosure and other desirable characteristics can be obtained is explained in the following description and attached drawings in which.

Figure 1:
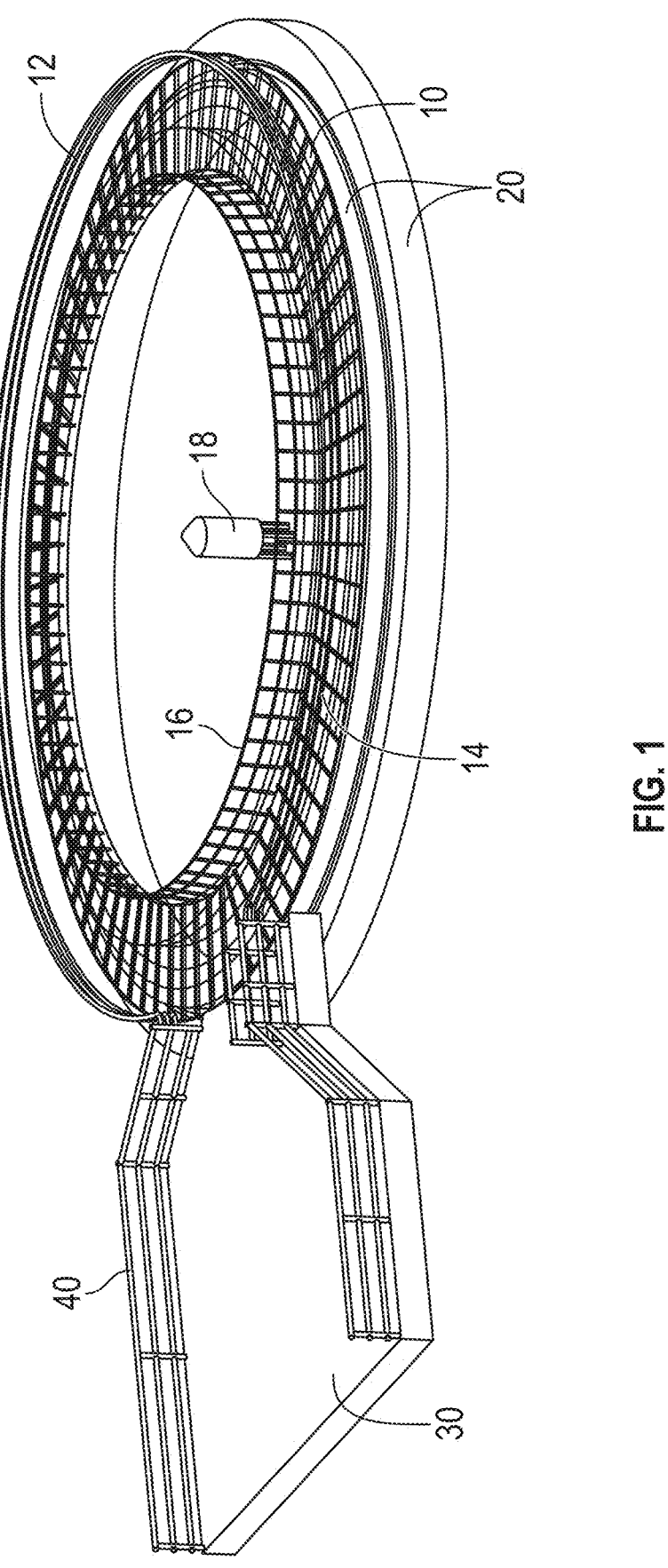
FIG. 1 is a general schematic perspective view of systems of the present disclosure.

It is to be noted, however, that the appended drawings are not to scale, and illustrate only typical embodiments of this disclosure. Therefore, the drawing figures are not to be considered limiting in scope, for the disclosure may admit to other equally effective embodiments. Identical reference numerals are used throughout the several views for like or similar elements.

DETAILED DESCRIPTION

In the following description, numerous details are set forth to provide an understanding of the rotary parlours of the present disclosure and structures including same. However, it will be understood by those skilled in the art that the apparatus, systems and processes disclosed herein may be practiced without these details and that numerous variations or modifications from the described embodiments may be possible. All technical articles, published and non-published patent applications, standards, patents, statutes and regulations referenced herein are hereby explicitly incorporated herein by reference, irrespective of the page, paragraph, or section in which they are referenced. Where a range of values describes a parameter, all sub-ranges, point values and endpoints within that range or defining a range are explicitly disclosed herein. All percentages herein are by weight unless otherwise noted.

All numbers disclosed herein are approximate values, regardless whether the word "about" or "approximate" is used in connection therewith. They may vary by 1%, 2%, 5%, and sometimes, 10 to 20%. Whenever a numerical range with a lower limit, RL and an upper limit, RU, is disclosed, any number falling within the range is specifically disclosed. In particular, the following numbers within the range are specifically disclosed: $R=RL+k*(RU-RL)$, wherein k is a variable ranging from 1% to 100% with a 1% increment, i.e., k is 1%, 2%, 3%, 4%, 5%, ..., 50%, 51%, 52%, ..., 95%, 96%, 97%, 98%, 99%, or 100%. Moreover, any numerical range defined by two R numbers as defined in the above is also specifically disclosed.

The term "comprising" and derivatives thereof is not intended to exclude the presence of any additional component, step or procedure, whether or not the same is disclosed herein. In order to avoid any doubt, all systems, processes, and compositions claimed herein through use of the term "comprising" may include any additional component, step, additive, adjuvant, or compound whether monomeric, oligomeric, polymeric or otherwise, unless stated to the contrary.

In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

As mentioned herein, despite the apparent convenience of the known rotary milking parlours, problems remain. Recurring issues include maintenance, operating costs, and lack of flexibility in speed. Many parlours operate at a fixed speed, mostly in an effort to reduce maintenance on complicated variable speed units. However, operating at fixed speed can limit flexibility in adapting to individual animal needs or addressing specific milking challenges. The labor and expense required to repair both fixed speed and variable speed units and other structures make repairs difficult for owners and repair professionals alike.

Referring now to the drawing figures, FIG. 1 is a general schematic perspective view of systems of the present disclosure illustrating some of the features of the systems, including a rotary platform 10, generally made of steel, and including a plurality of bails 2, a stationary annular support platform 20 coupled with rotary platform 10 by magnetic elements described herein (not viewable in FIG. 1), a plurality of stalls 14, an outer fence 12 and an inner fence 16, and a milk tank 18. An entry platform 30 with fencing 40 routes animals into stalls 14 as rotary platform 10 rotates. Fences 12, 16, and 40 may be tubular (where "tubular" herein includes both hollow and solid tube-like structures, which may be round in cross-section or other shape).

Figure 2:
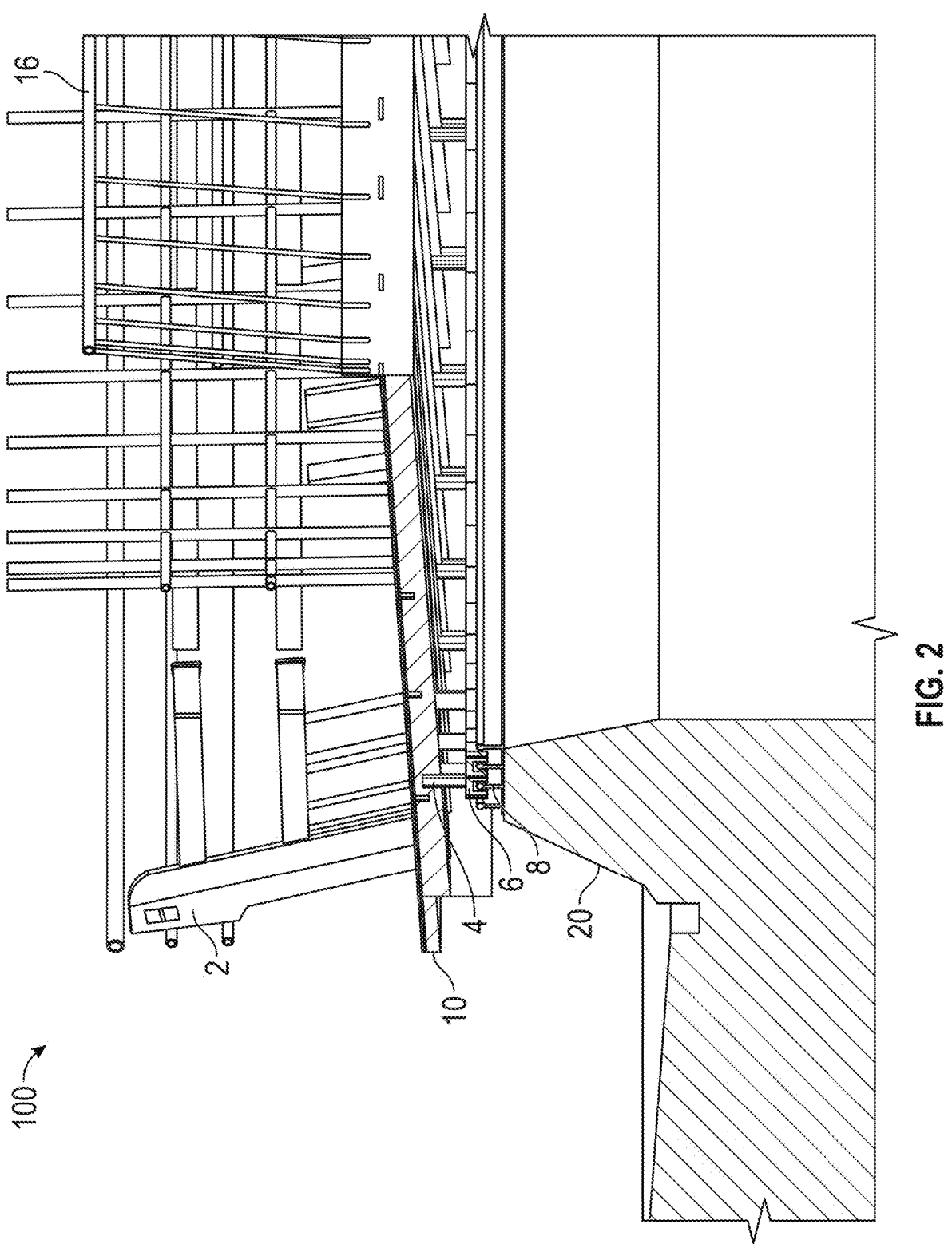
FIG. 2 is a schematic side elevation view, partially in cross-section, of one embodiment in accordance with the present disclosure.
Figures 3, 4:
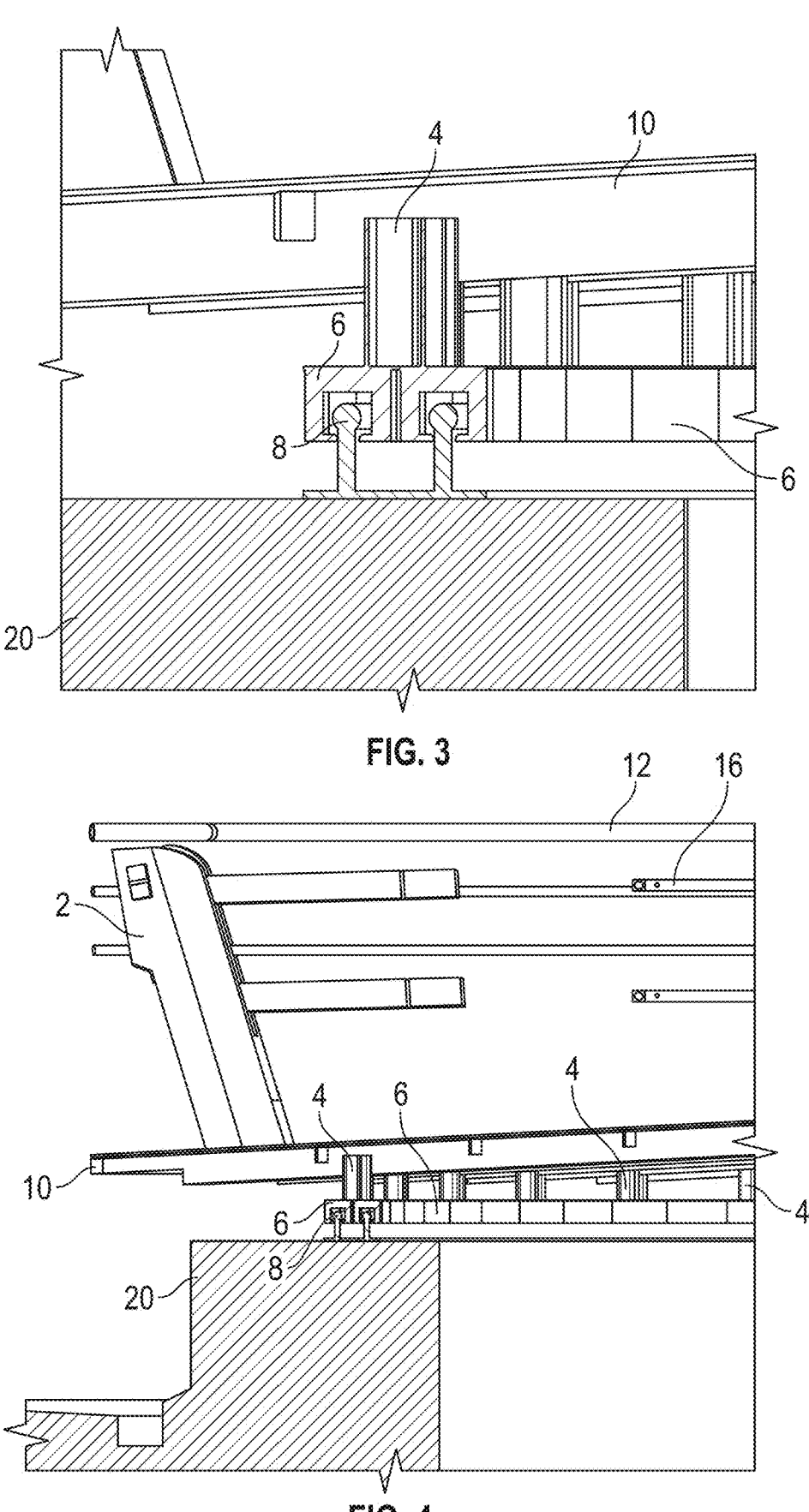
FIGS. 3 and 4 are schematic side elevation close-up views, partially in cross-section, of the embodiment illustrated in FIG. 2.
Figure 5:
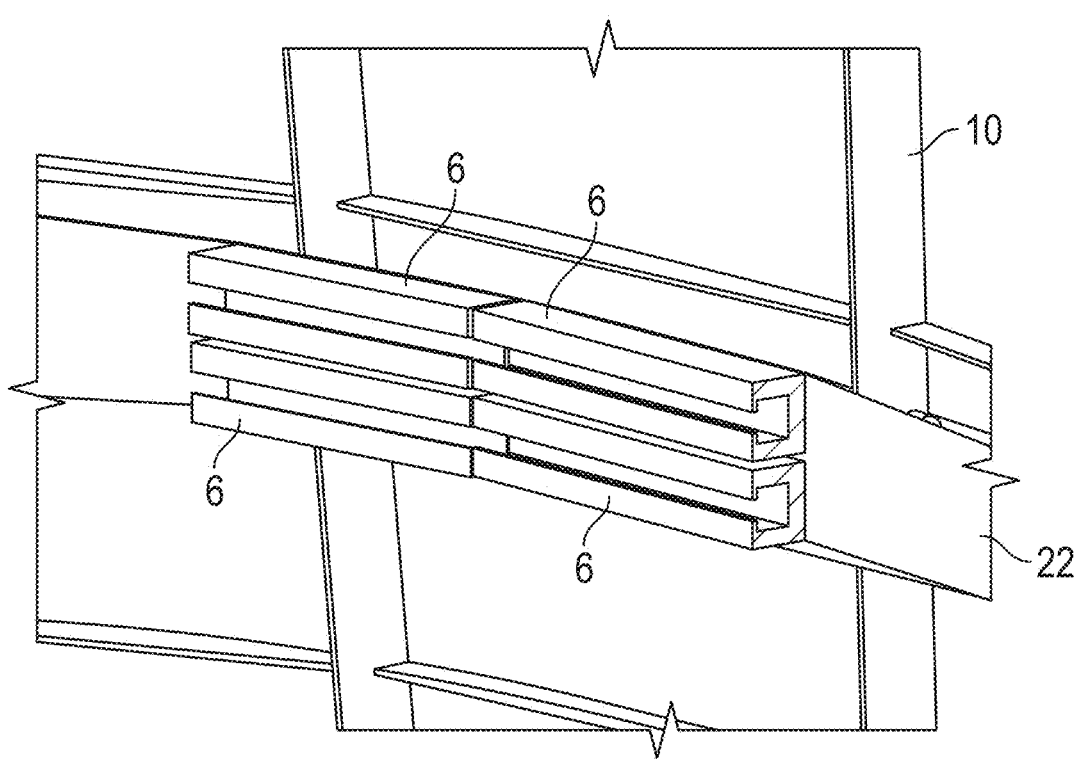
FIG. 5 is a schematic perspective view of some of the first magnetic elements employed in the embodiment illustrated schematically in FIGS. 2-4.

Referring now to FIGS. 2-6, one embodiment 100 of rotary parlours of the present disclosure are illustrated. FIG. 2 is a schematic side elevation view, partially in cross-section, of embodiment 100, illustrating rotary platform 10 including a plurality of bails 2 (only one is illustrated), rotary platform 10 coupled to annular support platform 20 by first magnetic elements 6 and second magnetic elements 8. In embodiment 100, two curvilinear rows of first magnetic elements 6 are employed, where each are generally U-shaped in cross-section, although other cross-sectional shapes may be envisioned, such as round, oval, and the like, and they are fastened to a backing plate 22 (FIG. 5) by bolts, welding, brazing or other fasteners (not illustrated for brevity), and/or simply immobilized by virtue of magnetic attraction to metal (steel) backing plate 22. Second magnetic elements in embodiment 100 are two curvilinear rails 8, each curvilinear rail 8 secured to stationary annular support platform 20 by bolts, welding, brazing or other fasteners (also not illustrated for brevity) and/or simply immobilized by virtue of magnetic attraction to a metal (steel) sheet positioned between rails 8 and stationary annular support platform 20. A plurality of generally vertical girders 4 connects rotary platform 10 with first magnetic elements 6 and support rotary platform 10 above stationary annular support platform 20. FIGS. 3 and 4 are schematic side elevation close-up views, partially in cross-section, of embodiment 100, while FIG. 5 is a schematic perspective view of some of the first magnetic elements 6 employed in the embodiment illustrated schematically in FIGS. 2-4.

Figure 6:
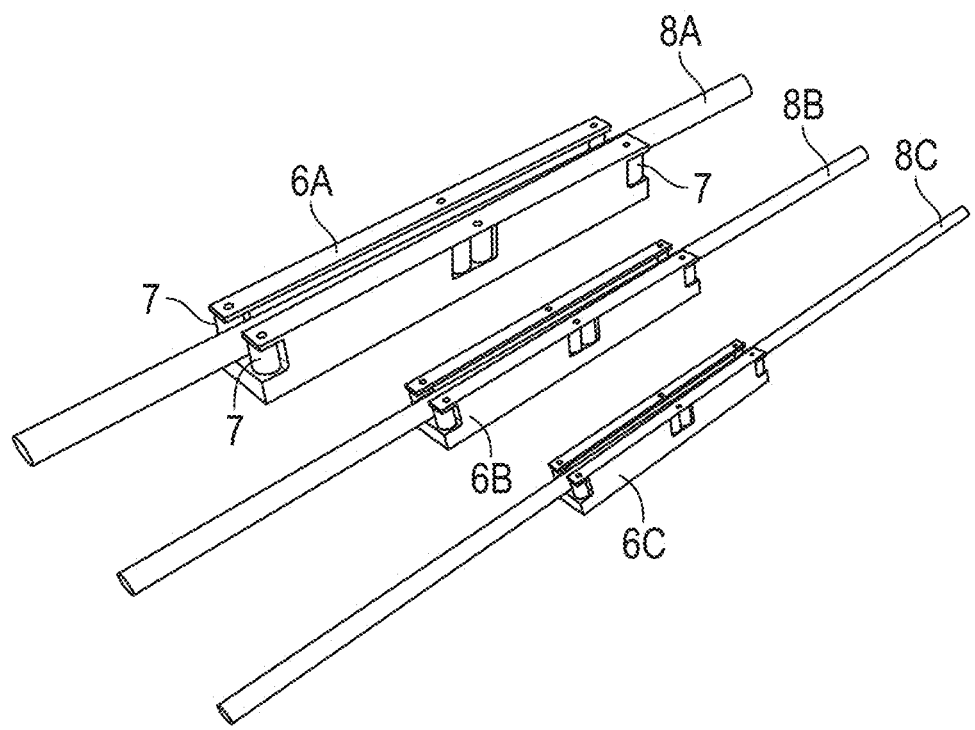
FIG. 6 illustrates three different sizes of elements.
Figure 6A:
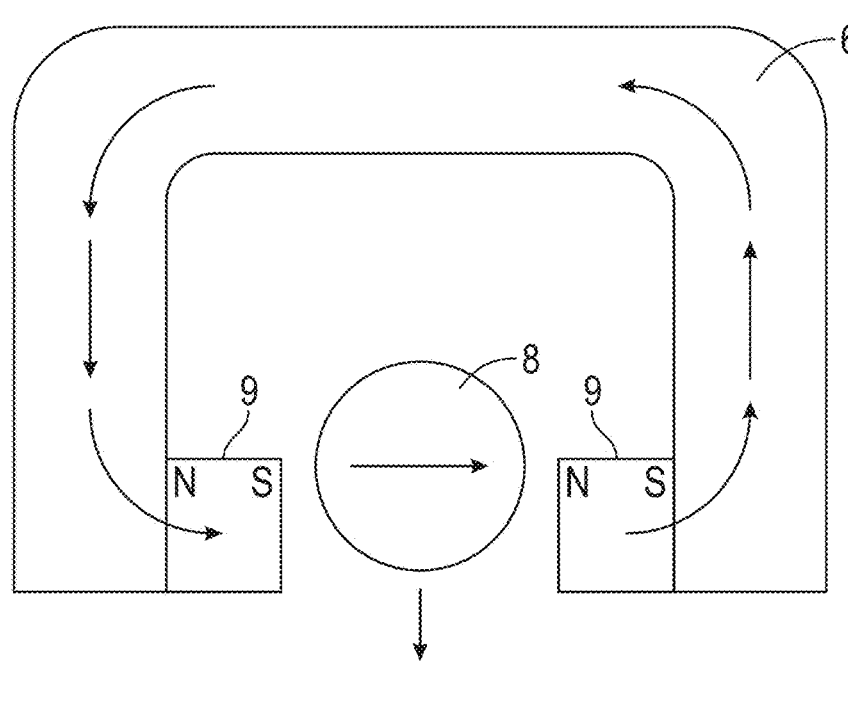

FIG. 6 illustrates perspective views of three different sizes of magnetic levitation elements suitable for use in systems of the present disclosure. Although these elements are illustrated as linear, it will be understood that curvilinear elements would be used for the rotary parlours disclosed herein. First magnetic elements 6A, 6B, and 6C are each illustrated with a respective round rail 8A, 8B, 8C. One supplier of such elements in Ironbox srl, Treviso, Italy, and their construction and operation are explained in U.S. Pat. No. 11,167,647. As explained more fully in the '647 patent, the levitation elements comprise a rail (8A, 8B, 8C) which is made of material reactive to a magnetic field, such as iron or low carbon steel, and which comprises two opposite side surfaces; a sliding first magnetic element (6A, 6B, 6C) in the form of a skid which is slidable on the rail and, being substantially U-shaped, comprises two parallel arms whose facing surfaces delimit an empty space occupied (e.g. partially) by the rail, each of the two opposite side surfaces of the rail facing respectively one of the facing surfaces of the two parallel arms, the skid being capable of generating a magnetic field with polar axis perpendicular to said facing surfaces. In most cases the magnetic field is generated by permanent bar magnets, 9, placed inside the sliding element 6. See FIG. 6A, illustrating magnetic flux with arrows, and a further arrow illustrating magnetic force. The rails 8A, 8B, and 8C correspond to the second magnetic element (ferromagnetic), and the bar magnets inside the sliding element or skid correspond to first magnetic elements (6A, 6B, and 6C). Stainless steel rollers 7 are used as guides.

Figure 7:
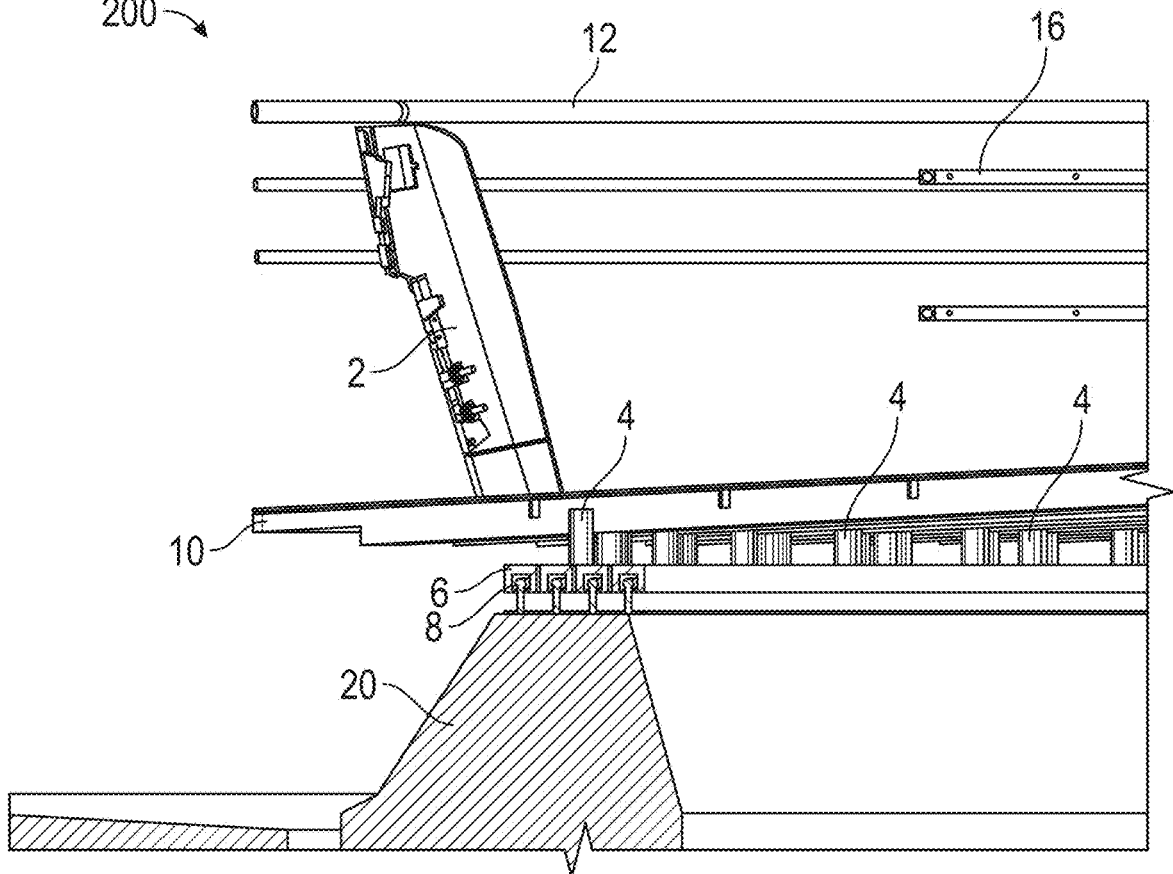
FIG. 7 is a schematic side elevation view, partially in cross-section, of another embodiment in accordance with the present disclosure.
Figure 8:
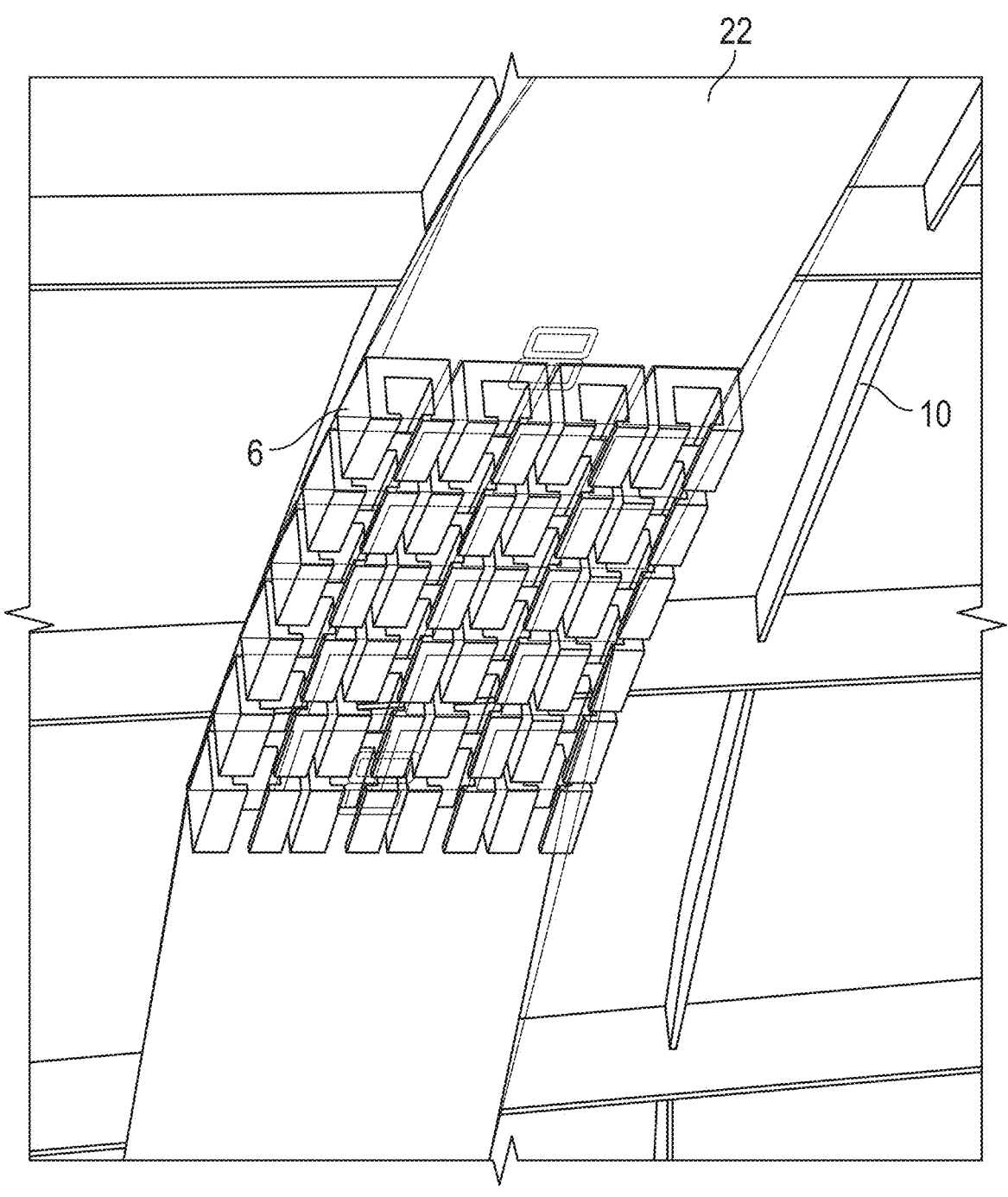
FIGS. 8-12 are schematic perspective views of some of the first and second magnetic elements employed in the embodiment illustrated schematically in FIG. 7.
Figure 9:
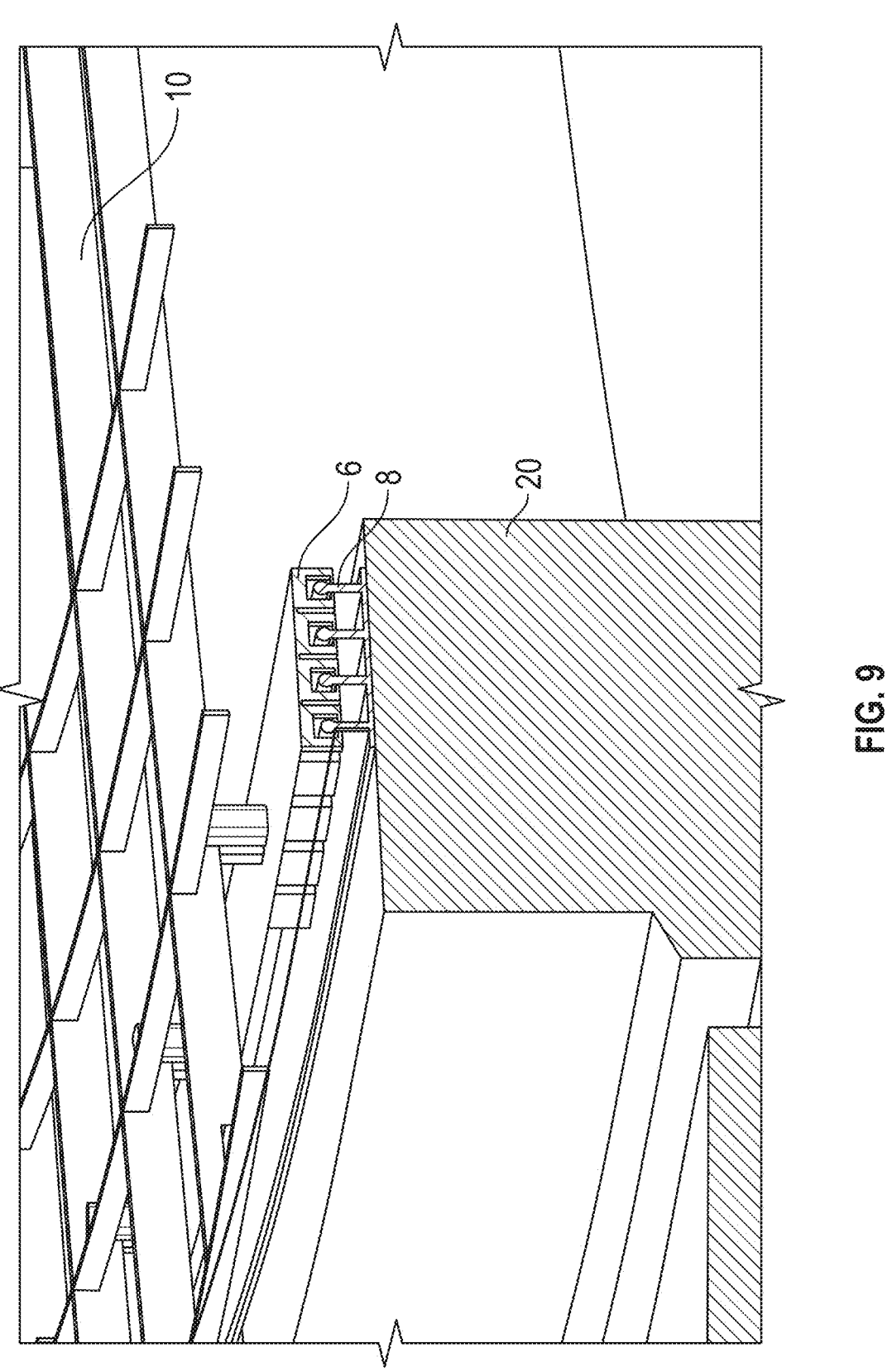
Figure 10:
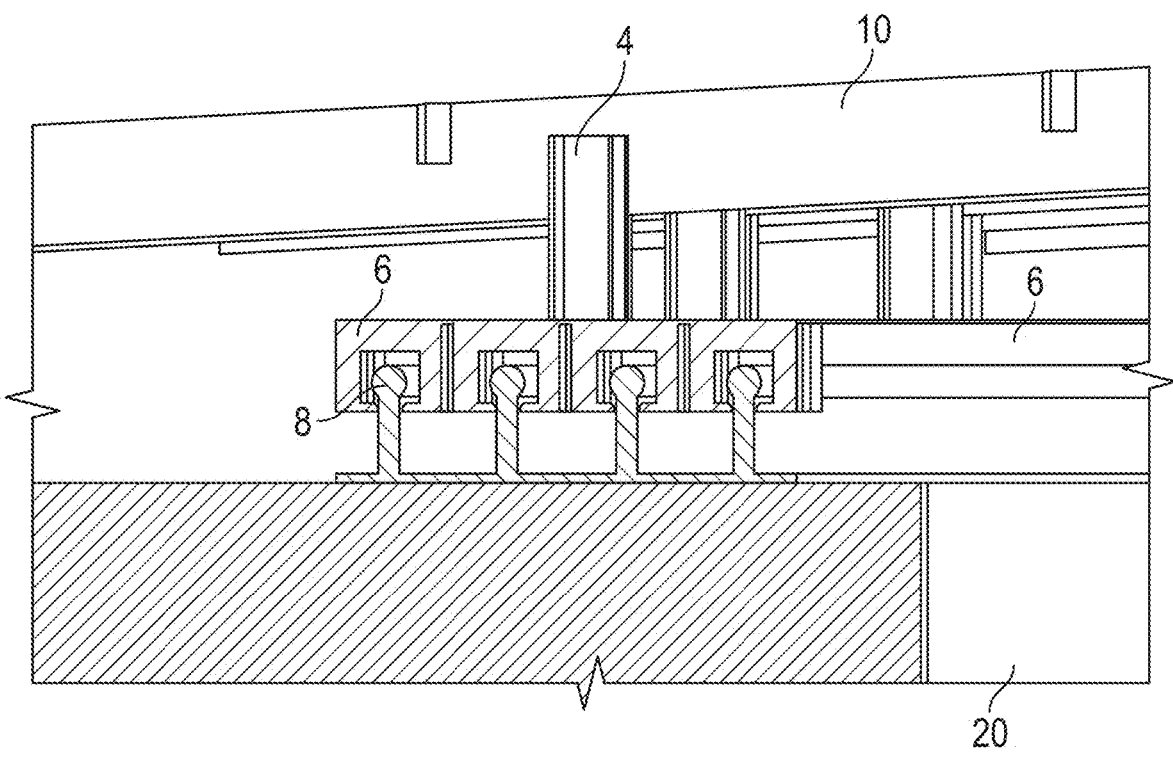
Figure 11:
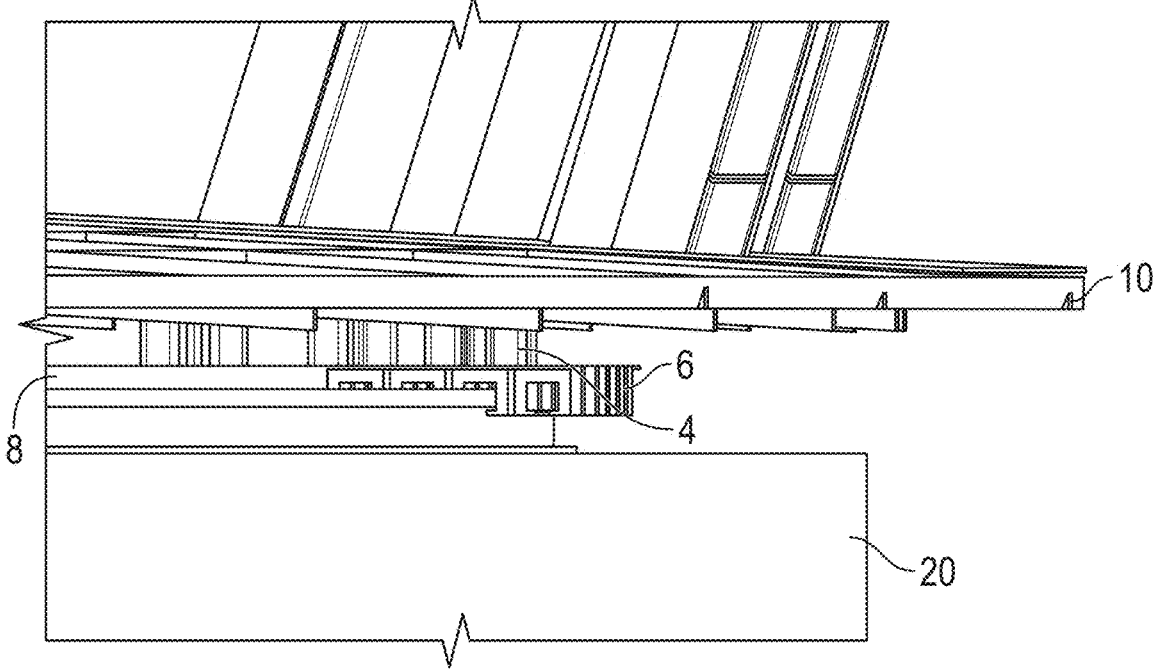
Figure 12:
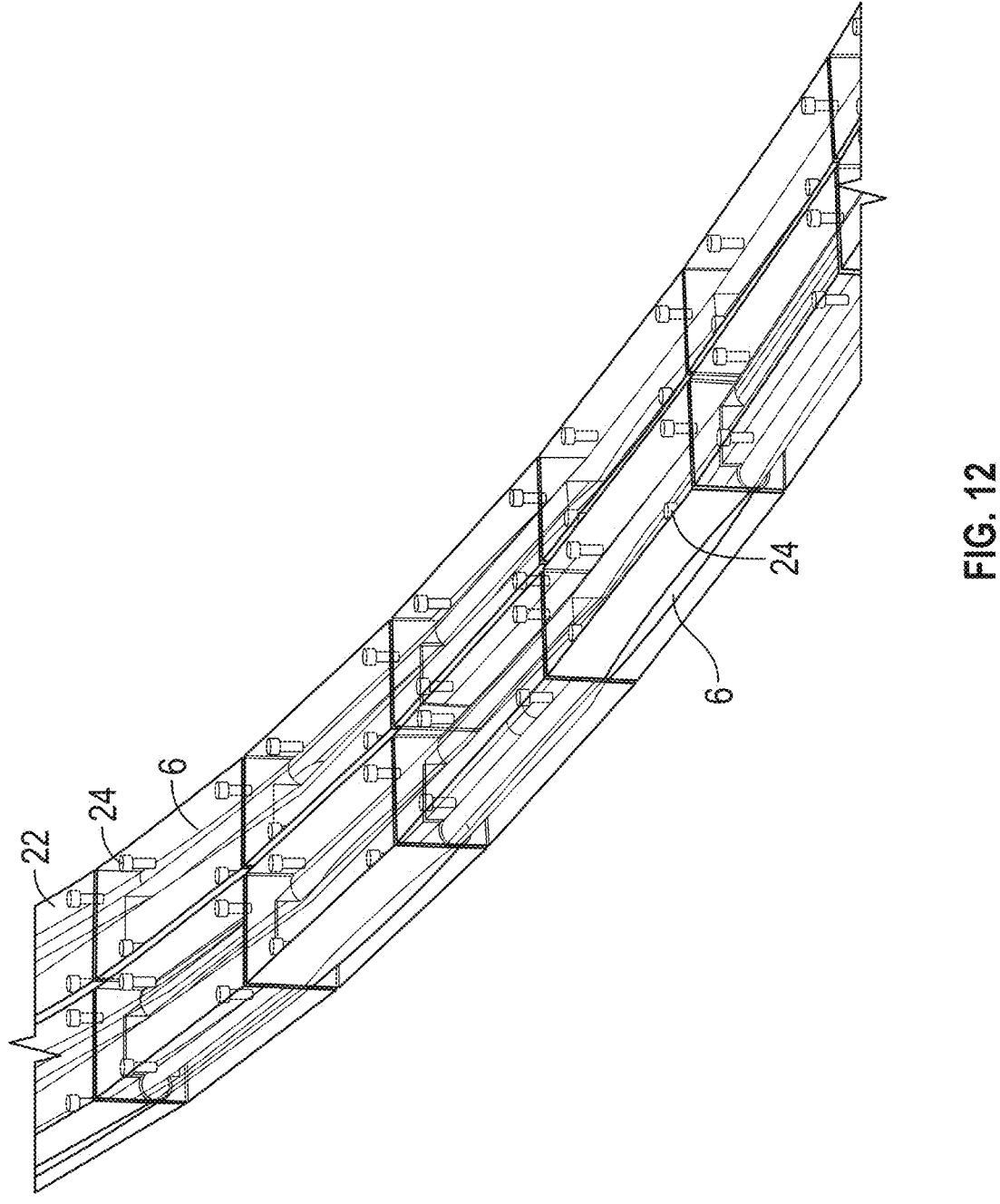

FIG. 7 is a schematic side elevation view, partially in cross-section, of another embodiment 200 in accordance with the present disclosure, and FIGS. 8-12 are schematic perspective views of some of the first and second magnetic elements (6, 8) employed in embodiment 200. Embodiment 200 uses the same magnetic principles of embodiment 100, but rather than two curvilinear rows of U-shaped elements 6 and two curvilinear rails 8, embodiment 200 employs four curvilinear rows of U-shaped elements 6, and corresponding four curvilinear rails 8, as illustrated schematically in FIGS. 7-12. FIG. 12 illustrates bolting of U-shaped magnetic elements 6 to support plate 22 using a plurality of bolts 24.

Figures 13, 14:
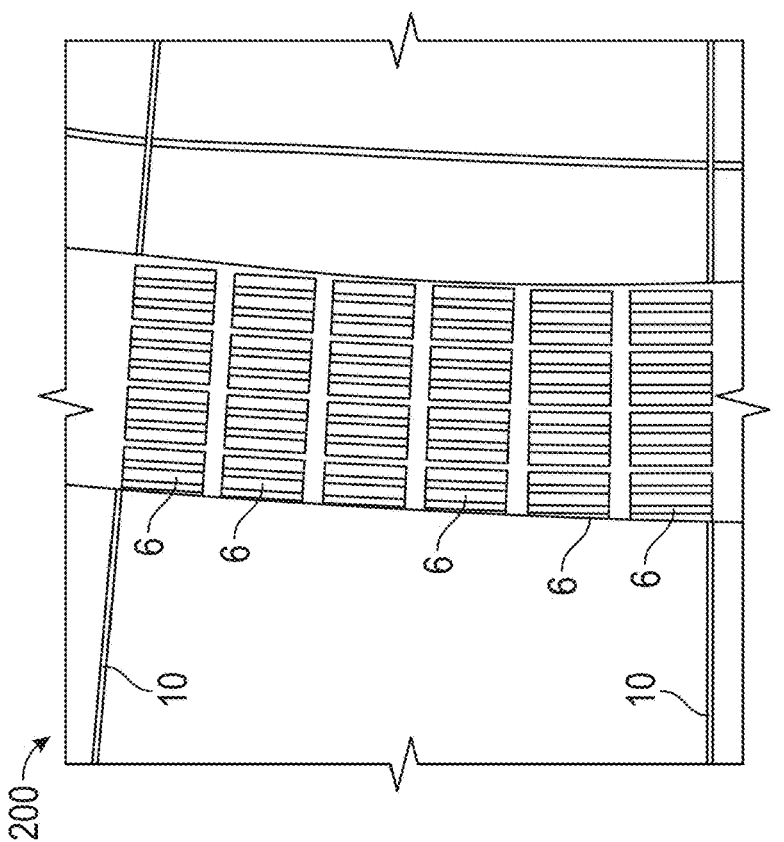
FIGS. 13 and 14 schematically compare the positioning of first magnet elements in embodiments illustrated schematically in FIGS. 1-12.

FIGS. 13 and 14 schematically compare the positioning of first magnet elements 6 in embodiments 100 and 200. In embodiment 100, four U-shaped elements 6 are arranged as illustrated schematically in FIG. 13. Each element 6 is a D30-L-486 element, meaning the elements are 486 mm in length, and have a width of 30 mm. In embodiment 200, twenty-four U-shaped elements 6 are arranged as illustrated schematically in FIG. 14. Each element 6 is a D30-L-136 element, meaning the elements are 136 mm in length, and have a width of 30 mm.

Figure 15:
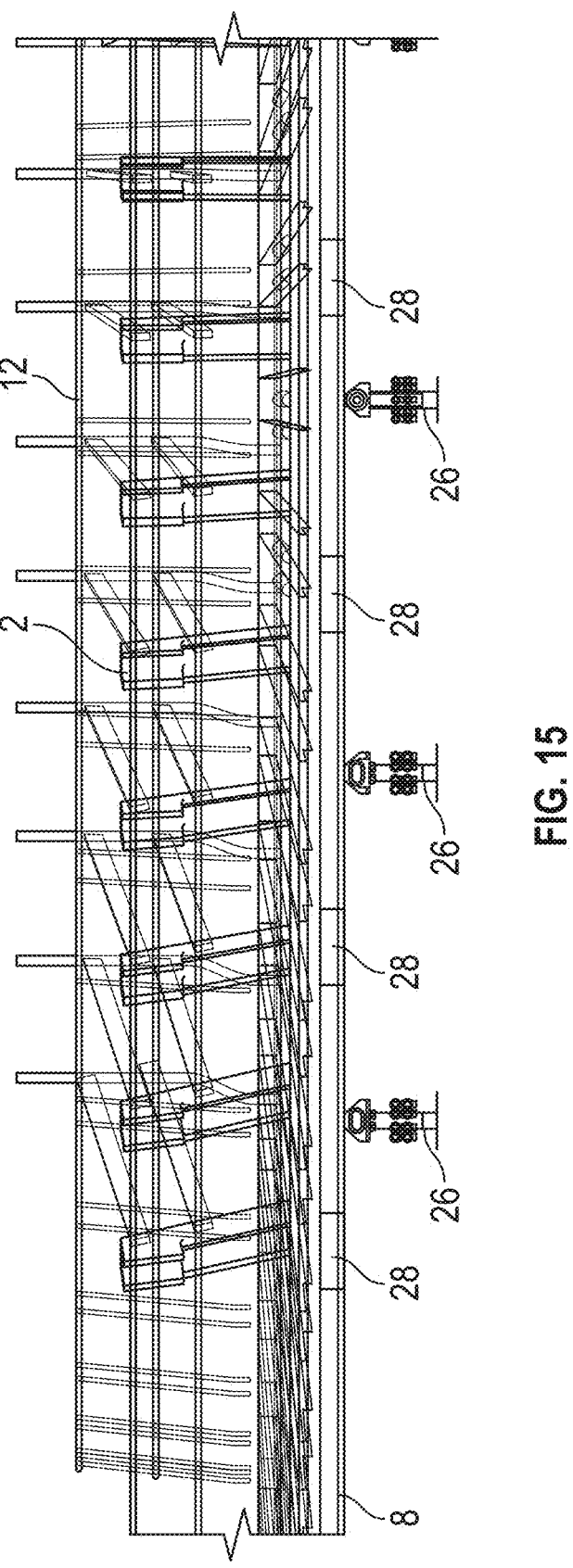
FIG. 15 is a schematic side elevation view of a portion of an embodiment of the present disclosure where optional support rollers may be included.

FIG. 15 is a schematic side elevation view of certain embodiments of the present disclosure employing optional roller supports 26. Magnetic rail 8 is generally supported by the magnetic elements, but a plurality of roller supports 26, which are secured to the stationary annular platform 20 (not illustrated in FIGS. 13 and 14) may be supplied as a backup or safety precaution.

In certain embodiments, the first magnetic elements 6 have polarity opposite that of the second magnetic element 8. In certain embodiments, the magnets may be flat shaped and embedded into plastic U-shaped holders. In certain embodiments, the flat-shaped magnets may have a north pole on one of their major surfaces and a south pole on its other major surface. In any case, first and second magnetic elements 6 and 8 have a specific spatial relationship. The respective north and south poles of these magnets are arranged so that when placed as viewed in the figures herein, they will substantially repel one another by virtue of their respective magnetic field lines being unable to cross, forcing the rotary platform away from (above) the stationary annular platform.

Magnet materials which may be useful in apparatus of this disclosure include iron, cobalt, nickel, steel, rare-earth magnetic metals, alnico metals, and combinations and alloys thereof. Rare earth magnets, such as samarium-cobalt and neodymium-iron-boron magnets may be used. It has become possible to produce magnets with curvilinear dimensions for rotary platform applications and yet still provide the necessary forces. Certain embodiments may employ magnets of the "closed field" type. In this type of system, a soft magnetic or ferromagnetic material, such as ferritic or martensitic stainless steel or Pd—Co—Ni alloy may be used. U.S. Pat. Nos. 6,659,771, 5,678,998, 5,013,243 and 6,299,450 describe small yet powerful magnets for cooperating with a non-magnet implanted "keeper" for denture attachment. The non-magnet keeper is made of a magnet-attracted material, such as a soft magnetic or ferromagnetic material, but is not a permanent magnet. U.S. Pat. No. 4,396,373 describes permanent magnets that may be configured having facing poles which, when in registry, exert a magnetic force in a direction substantially normal to a plane. The opposing magnets have confronting poles with like-polarity such that the magnets repel. U.S. Pat. No. 4,671,767 discloses magnets oriented such that they repel each other, thereby creating magnetic forces parallel to a plane for urging a component forward. U.S. Pat. No. 7,712,468 discloses magnetic dental appliance. Any of the magnets discussed in these patents and publications would be useable in systems disclosed herein.

The rotary milking parlours illustrated schematically in the various figures comprise several non-limiting examples. Other configurations are possible, depending upon the specific design parameters. With regard to the magnetic elements 6, the embodiments illustrated schematically in FIGS. 2-12 are just some simple arrangements and obviously could take on additional forms including various shapes, widths, rows of elements, and the like. As those skilled in this art will readily appreciate, there are countless variations possible and the embodiments herein are simple and effective—but not optimized.

The rotary platform, entry platform, and fences may be made of stainless steels, for example, but not limited to, 304, 316, as well as titanium alloys, aluminum alloys, copper, copper alloys, and the like. Galvanized steel is quite commonly used. The skilled artisan, having knowledge of the particular application, temperatures, and available materials, will be able design the most cost effective, safe, and operable components for each particular application without undue experimentation.

The magnetic elements of the present disclosure need not have specific shapes or specific features as illustrated in the drawings, but rather could take any shape, such as a box or cube shape, elliptical, triangular, prism-shaped, hemispherical or semi-hemispherical-shaped (dome-shaped), or combination thereof and the like, as long as the rotary milking parlours perform as desired. The element 6 cross-sections need not be round, but may be rectangular, triangular, round, oval, and the like. It will be understood that such embodiments are part of this disclosure and deemed with in the claims. Furthermore, one or more of the various components may be ornamented with various ornamentation produced in various ways (for example stamping or engraving, or raised features such as reflectors, reflective tape), such as facility designs, operating company designs, logos, letters, words, nicknames (for example MADERO, and the like).

From the foregoing detailed description of specific embodiments, it should be apparent that patentable rotary milking parlours and methods of using same have been described. Although specific embodiments of the disclosure have been described herein in some detail, this has been done solely for the purposes of describing various features and aspects of the rotary milking parlours and methods and is not intended to be limiting with respect to their scope. It is contemplated that various substitutions, alterations, and/or modifications, including but not limited to those implementation variations which may have been suggested herein, may be made to the described embodiments without departing from the scope of the appended claims. For example, one modification would be to modify or retrofit an existing rotary parlour to include one or more magnetic elements of this disclosure. Certain rotary milking parlours and processes of this disclosure may be devoid of certain steps, components and/or features: for example, rotary milking parlours devoid of electrical connections for the magnetic units; rotary milking parlours devoid of exotic metals; and rotary milking parlours devoid of low-strength steels.

What is claimed is:

1. A magnetically levitated rotary milking parlour comprising:

a rotatable annular platform sufficient to support multiple animals, the rotatable annular platform rotatable about an axis of rotation and having a plurality of stalls in which the animals are to be milked, the stalls arranged about a first perimeter of the rotatable platform;

a fixed annular support platform having a second perimeter the same as the first perimeter, the rotatable annular platform magnetically levitated above the fixed annular support platform by a magnetic sub-system;

the magnetic sub-system comprising:

a first ferromagnetic element comprising one or more curvilinear U-shaped ferromagnetic skids comprising two parallel arms whose facing surfaces each have a permanent magnetic element attached thereto and delimiting an empty space occupied at least partially by a second ferromagnetic element;

the second ferromagnetic element comprising a curvilinear ferromagnetic rail having a circular cross-section, each of two opposite side surfaces of the curvilinear ferromagnetic rail facing respectively one of the permanent magnetic elements secured to the facing surfaces of the two parallel arms of the one or more curvilinear U-shaped ferromagnetic skids;

the one or more curvilinear U-shaped ferromagnetic skids secured to an under side of the rotatable annular platform around the first perimeter;

the ferromagnetic rail secured to an upper side of the fixed annular support platform around the second perimeter;

the one or more curvilinear U-shaped ferromagnetic skids configured to generate a magnetic field having a polar axis perpendicular to the facing surfaces and having magnetic flux flowing therethrough such that they are repelled from the ferromagnetic rail with force sufficient to levitate the rotatable annular platform when some or all stalls have animals present therein;

the one or more curvilinear U-shaped ferromagnetic skids and the ferromagnetic rail separated by an air gap, each having axial symmetry with respect to the axis of rotation; and the one or more curvilinear U-shaped ferromagnetic skids comprising one or more pairs of guide rollers.

2. The magnetically levitated rotary milking parlour of claim 1 wherein the one or more curvilinear U-shaped ferromagnetic skids comprises two curvilinear rows thereof, and the ferromagnetic rail comprises two curvilinear ferromagnetic rails, each curvilinear rail positioned in a respective curvilinear row.

3. The magnetically levitated rotary milking parlour of claim 1 wherein the one or more curvilinear U-shaped ferromagnetic skids comprises four curvilinear rows thereof, and the ferromagnetic rail comprises four curvilinear ferromagnetic rails, each curvilinear rail positioned in a respective curvilinear row.

4. The magnetically levitated rotary milking parlour of claim 1 wherein each stall comprises a bail with teatcups configured to be applied to teats of an animal present in the stall, and at least one local milk tank connected to the teatcups via a respective milk conduit.

5. The magnetically levitated rotary milking parlour of claim 1 wherein the permanent magnetic element comprises magnetic materials selected from iron, cobalt, nickel, steel, rare-earth magnetic metals, alnico metals, and combinations and alloys thereof.

6. The magnetically levitated rotary milking parlour of claim 5 wherein the rare-earth magnetic metals are selected from gadolinium, dysprosium, terbium, niobium, and combinations and alloys thereof.

* * * * *